(12) United States Patent
Ngai

(10) Patent No.: US 6,314,627 B1
(45) Date of Patent: Nov. 13, 2001

(54) HYDROENTANGLED FABRIC HAVING STRUCTURED SURFACES

(75) Inventor: Mou C. Ngai, Boxmeer (NL)

(73) Assignee: Polymer Group, Inc., No. Charleston, SC (US)

( * ) Notice: Subject to any disclaimer, the term of this patent is extended or adjusted under 35 U.S.C. 154(b) by 0 days.

(21) Appl. No.: 09/342,799

(22) Filed: Jun. 29, 1999

Related U.S. Application Data
(60) Provisional application No. 60/091,236, filed on Jun. 30, 1998.

(51) Int. Cl.[7] .................................................. D04H 1/46
(52) U.S. Cl. ................................. 28/104; 28/105
(58) Field of Search ........................... 28/104, 105, 103; 442/384, 387, 408

(56) References Cited

U.S. PATENT DOCUMENTS

| | | |
|---|---|---|
| 3,485,706 | 12/1969 | Evans . |
| 4,741,941 | 5/1988 | Englebert et al. . |
| 4,808,467 * | 2/1989 | Suskind et al. ........................ 28/104 |
| 4,902,564 | 2/1990 | Israel et al. . |
| 5,098,764 | 3/1992 | Drelich et al. . |
| 5,292,581 * | 3/1994 | Viazmensky et al. .................. 28/104 |
| 5,425,158 | 6/1995 | Ripley . |
| 5,459,912 * | 10/1995 | Oathout .................................. 28/105 |
| 5,645,916 | 7/1997 | Oathout . |
| 5,674,591 | 10/1997 | James et al. . |
| 6,022,818 * | 2/2000 | Welchel et al. ........................ 28/104 |
| 6,063,717 * | 5/2000 | Ishiyama et al. ..................... 442/387 |

\* cited by examiner

*Primary Examiner*—Amy B. Vanatta
(74) *Attorney, Agent, or Firm*—Pyle & Piontek

(57) ABSTRACT

A composite non-woven fabric has two outer non-woven layers with structured surfaces that are efficient at wiping solid or semi-solid matter, with a center non-woven layer that is substantially impermeable to the passage of solid or semi-solid matter. The fabric of the invention thus provides efficient wiping ability for solid and semi-solid matter in combination with a sanitary quality that prevents passage of such matter through the fabric. The fabric of the invention may find particular utility as a wipe. A method of making a composite non-woven fabric includes the general steps of forming a first and second hydroentangled non-woven webs with structured surfaces, and laminating the first and second webs to a central non-woven web that is substantially impermeable to passage of solid and semi-solid matter.

10 Claims, 5 Drawing Sheets

Single Side w/ Structure
Process 1 - Font
06/11/99

Single Side w/ Structure
Process 2 - Back
06/10/99

Plain
Back
06/11/99

Plain
Front
06/11/99

HYDROENTANGLED FABRIC HAVING STRUCTURED SURFACES

CROSS REFERENCE

The present invention claims the priority of U.S. Provisional Application No. 60/091,236 filed Jun. 30, 1998.

FIELD OF THE INVENTION

The present invention relates to non-woven fabrics. In particular, the present invention relates to hydroentangled non-woven composite fabrics.

BACKGROUND OF THE INVENTION

Non-woven fabrics are well known in the art. Because of their relative low cost of manufacture and their ability to be designed for particular applications, non-woven fabrics are widely used in a number of consumer and industrial purposes. As an example, non-woven fabrics are frequently used to fabricate wipes for sanitary, industrial, and consumer applications that include collecting solid matter.

Present non-woven wipes suffer several disadvantages, however, particularly when used to wipe solid or semi-solid matter. As a wipe is often used to remove materials such as dirt, grease, or even fecal matter, the wipe desirably should have a surface that is efficient for collection of such matter. In addition, for sanitary reasons, the wipe should be relatively impenetrable and impervious to such matter. To a practical extent, these two desirable qualities are mutually exclusive. A loosely bound non-woven fabric with a surface having a three dimensional texture or apertures is generally efficient at collection of solid matter. Non-woven fabrics prepared by hydroentangling fibers may be particularly well suited to achieve these qualities. Hydroentangling is well known in the art, and is described, for instance, in U.S. Pat. No. 3,485,706 to Evans, herein incorporated by reference.

Fabrics with such qualities, however, also tend to promote porosity of the fabric to the solid matter. More tightly bound non-woven fabrics without apertures and which tend to have a smooth surface, on the other hand, are much more impervious to passage of solid matter. The fabric's smooth surface, however, is less efficient for wiping, particularly where the material to be collected is a semi-solid with a tendency to smear upon wiping, such as grease or fecal material.

Present non-woven wipes generally place a higher value on sanitary needs than on wiping efficiency. That is, present non-woven wipes generally sacrifice wiping efficiency to insure high resistance to penetration of the fabric. Thus present non-woven wipes generally comprise tightly bound, smooth-surfaced fabrics. While these fabrics are efficient at preventing matter from passing through, as previously noted, they are inefficient at collecting such matter. Often several individual wipes must be used to completely clean a surface. These problems are particularly acute for baby wipes designed for wiping fecal matter from a baby, where penetration through the wipe of the solid or semi-solid fecal matter is most disadvantageous.

The prior art does include many examples of composite fabrics that may comprise a loosely entangled non-woven layer and a more resilient scrim. These fabrics, however, are generally configured for adsorbency, and are not well suited for wiping to collect solids or semi solids. The scrim is generally provided only for reinforcement, and comprises a fairly stiff and heavy element not appropriate for a wipe.

There is therefor an unresolved need for an improved non-woven fabric.

OBJECTS OF THE INVENTION

It is an object of the invention to provide a non-woven composite fabric having at least a first structured surface layer efficient at wiping solid or semi-solid matter and at least a second non-woven layer that is substantially impermeable to such matter.

It is a further object of the invention to provide a method for making a non-woven composite fabric having at least a first structured surface layer efficient at wiping solid or semi-solid matter and at least a second non-woven layer that is substantially impermeable to such matter.

SUMMARY OF THE INVENTION

The present invention generally comprises a non-woven composite fabric, as well as a method for making a non-woven composite fabric. The fabric of the invention comprises a first hydroentangled non-woven layer with a structured surface having a basis weight of at least 10 gm/m$^2$, and a second non-woven layer also having a basis weight of at least 10 gm/m$^2$ that is substantially impenetrable to solids and semi-solids. The first non-woven layer is very efficient for the wiping of solid or semi-solid matter because of its structured surface, while the second non-woven layer that is substantially impermeable to the solid or semi-solid matter prevents such matter from penetrating through the fabric. Thus a composite non-woven fabric results that is both efficient at wiping of solid or semi-solid material, and that is sanitary for holding and wiping.

As used herein, "structured surface" is intended to refer to either a three dimensional quality of a fabric surface, and/or to a surface that has a regular pattern of apertures. A three dimensional surface quality exists when a substantial portion of the surface is on a plane above a separate surface portion. The surface of the fabric is thus non-planar in that it exists in multiple planes. That is, the fabric surface has a portion that is raised from the surface base that may comprise for example, a series of ridges, bumps, or other geometric configurations. Further, it is intended that the different portions are discernable to an unaided human eye upon inspection. As is known in the art, there are various ways to produce fabrics with such surfaces. In particular, structured surface non-woven fabrics may be formed by transferring a pattern from a forming support, which may comprise a textured forming belt or drum, for instance. An example of hydroentangling fibers supported on a three dimensional forming surface is described in detail in U.S. Pat. Nos. 5,098,764 and 5,674,591, herein incorporated by reference.

Further, "structured surface" is also intended to refer to a fabric surface having a regular pattern of apertures. As is known in the art, fabrics with such surfaces may be formed by hydroentangling fibers supported on a surface having raised portions and recessed void areas disposed among the raised portions. The recessed void areas may comprise apertures. For example, a suitable support surface may comprise a surface with an aperture pattern such as a wire mesh forming belt. Producing non-woven fabrics using such support surfaces is known in the art, and is described in U.S. Pat. No. 4,741,941, herein incorporated by reference.

It has been discovered that fabrics having structured surfaces as described above are far more efficient at collecting solid or semi-solid materials than are fabrics with a substantially "flat" or un-structured surface. The increased surface area and various angled surface portions are thought to be advantageous in attaching and retaining solid or semi-solid material, particularly when wiping such materials which tend to smear.

A preferred embodiment of the fabric of the invention comprises three laminated non-woven layers, with first and third hydroentangled non-woven layers sandwiched about a second layer. In this preferred embodiment, the first and third layers have structured surfaces, individual basis weights of between about 20–40 gm/m$^2$, and a wiping efficiency (as will be described below) ratio to the second layer of at least 1.25:1 when tested with solid or semi-solid matter. The second non-woven layer is substantially impenetrable to passage of solids or semi-solids, and has a basis weight of between 20–40 gm/m$^2$. All three non-woven layers of this preferred embodiment are comprised of staple fibers of cellulosic rayon, polyolefin, polyester, or mixtures thereof.

Because of its unique qualities, the fabric of the invention may find particular utility when used as a baby wipe for collecting fecal matter.

The method of the invention generally comprises the steps of forming a first non-woven web by hydroentangling staple fibers on a forming belt, cylinder, or drum, with the resultant first web having a structured surface and a basis weight of at least 10 gm/m$^2$. An additional step comprises forming a second non-woven web that is substantially impenetrable to solids or semi-solids, and that has a basis weight of at least 10 gm/m$^2$. A final step comprises laminating the first and second webs together to form the non-woven composite fabric of the invention.

A preferred method of the invention comprises the steps of forming first and third non-woven webs by hydroentangling staple fibers of cellulosic rayon, polyolefin, polyester, or mixtures thereof, with the first and third webs each having a structured surface, each having a basis weight of between 20–40 gm/m$^2$. An additional step comprises forming a second non-woven web comprised of fibers of cellulosic rayon, polyolefin, polyester, or mixtures thereof; with a basis weight of between about 20–40 gm/m$^2$. The second non woven web is substantially impenetrable to solids or semi-solids. Both the first and third layers have a single wipe wiping efficiency ratio, as will be discussed in detail below, to the second layer of at least 1.25:1 when tested with solid or semi-solid matter The above brief description sets forth rather broadly the more important features of the present disclosure so that the detailed description that follows may be better understood, and so that the present contributions to the art may be better appreciated. There are, of course, additional features of the disclosure that will be described hereinafter which will form the subject matter of the claims appended hereto. In this respect, before explaining the several embodiments of the disclosure in detail, it is to be understood that the disclosure is not limited in its application to the details of the construction and the arrangements set forth in the following description or illustrated in the drawings. The present invention is capable of other embodiments and of being practiced and carried out in various ways, as will be appreciated by those skilled in the art. Also, it is to be understood that the phraseology and terminology employed herein are for description and not limitation.

DETAILED DESCRIPTION

Figure 1:
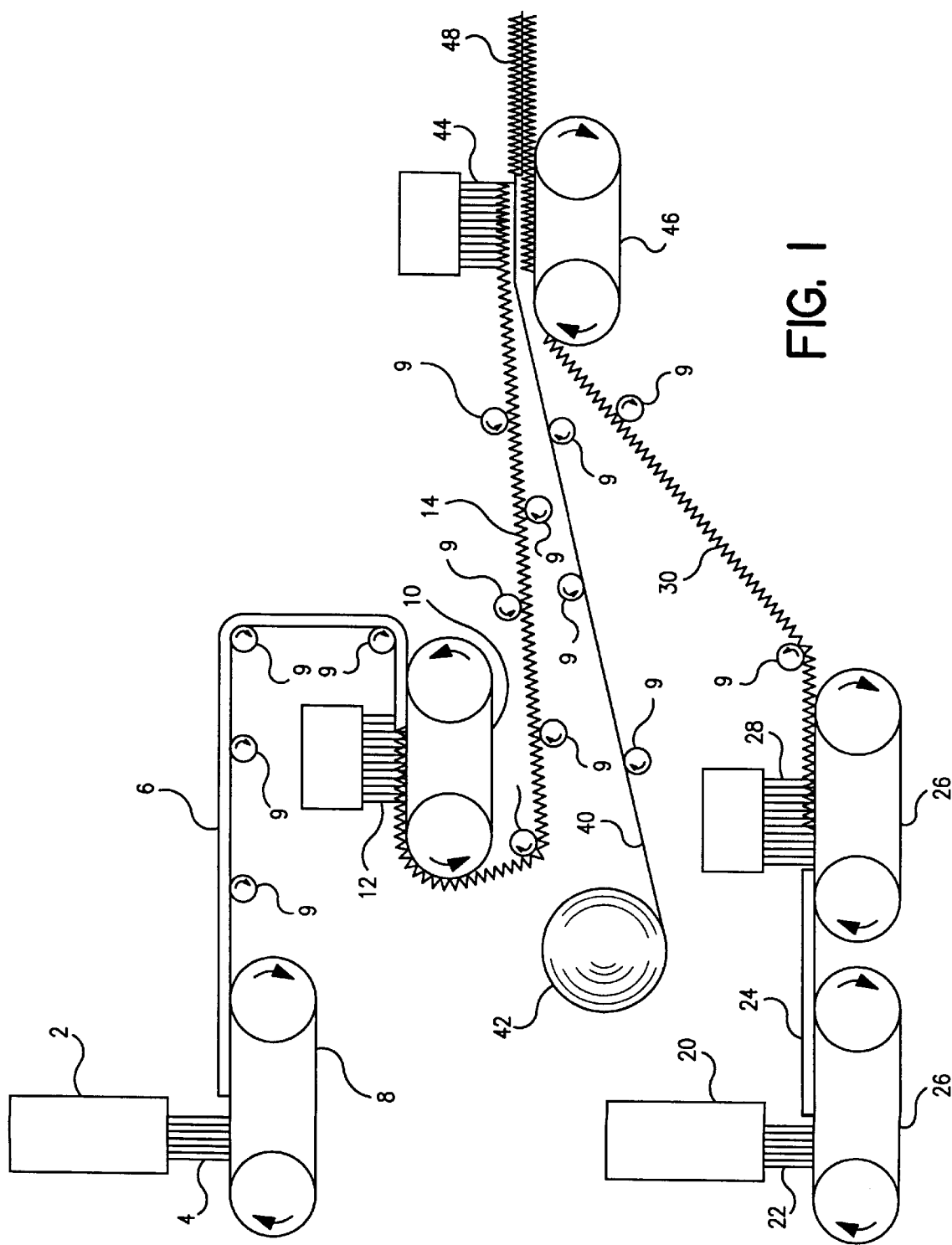
FIG. 1 is a schematic of a preferred embodiment of the method of the invention.

Turning now to the drawings, FIG. 1 is a schematic of a preferred method of the invention. Carding device 2 deposits staple fibers 4 to form a cohesive fiber web 6 on moving support 8. Carding device 2 may comprise any of several devices as known in the art, including, but not limited to, an "iso card" or "parallel card", as are known in the field. In addition, cohesive web 6 may have any of several orientations, including, but not limited to random or parallel orientation.

Cohesive web 6 is then transferred to forming belt 10, and subjected to entangling under water jets 12. Forming belt 10 has an opened structure or an apertured three dimensional surface so that the resulting first hydroentangled web 14 will have a structured surface, as is generally explained in U.S. Pat. Nos. 4,741,941 or 5,098,764 herein incorporated by reference. An example of a suitable forming belt 10 comprises a wire mesh belt of 0.65 mm diameter wire, 7 warps per cm, 6.3 wefts per cm, and a thickness of 1.1 mm. Further, as an alternative to forming belt 10, first structured surface web 14 may be formed by hydroentangling web 6 while supported on a rotating forming drum with three dimensional surface, as is generally described in U.S. Pat. No. 5,098,764.

In an additional similar series of steps to those used to form first structured surface web 14, a second structured surface web 30 is formed. Carding device 20 deposits staple fibers 22 to form a cohesive web 24 on moving support 26. Like card 2, carding device may comprise any of several variations generally known in the art, including, but not limited to, an iso card. Also, like web 6, web 24 may have any of several fiber orientations, including, but not limited to, a random or a parallel orientation.

Cohesive web 24 is transferred to forming belt 26 and subjected to hydroentanglement under water jets 28. Forming belt 26 has the same general surface characteristics as forming belt 10, so that a structured surface web 30 results. A suitable example of forming belt 26 comprises a wire mesh belt having 0.65 mm diameter wire, 7 warps per cm, 6.3 wefts per cm, and a thickness of 1.1 mm.

Figure 2A:
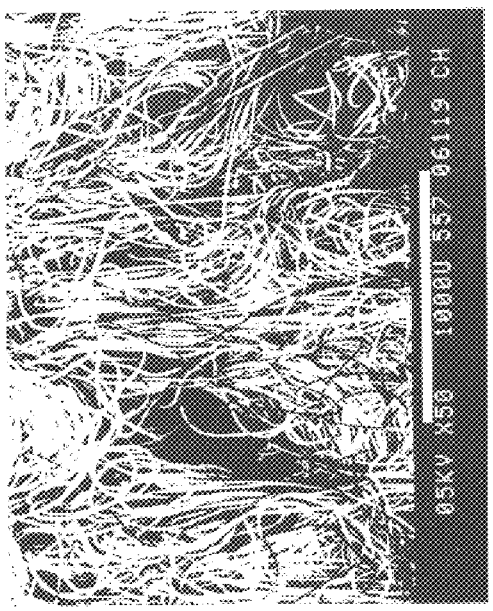
FIGS. 2A and 2B are 50 times magnification microphotographs of the front and back, respectively of an embodiment of the structured surface web of the invention.
Figure 2B:
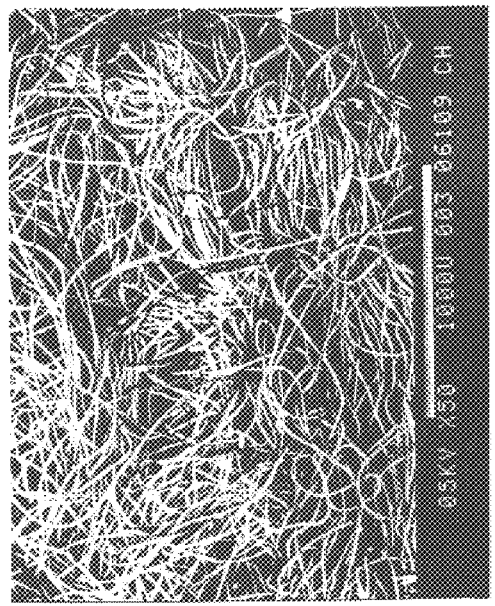

Staple fibers 4 and 22 preferably comprise cellulosic rayons, polyolefins, polyesters, or mixtures thereof, with particular preferred examples including fibers of viscose rayon and polypropylene. Fibers 4 and 22 are preferably 0.9–10 dtex, and of staple lengths of 5–100 mm. Preferred basis weights for structured surface webs 14 and 30 are between 20–40 gm/m$^2$, with a weight of about 30 gm/m$^2$ found particularly useful in baby wipe applications. To produce a 30 gm/m$^2$ basis weight structured surface web 14 or 30 using preferred fibers, it has been found useful for water jets 12 and 28 to supply approximately 1300 kJ/kg energy. FIGS. 2A and 2B are microphotographs taken at 50 times resolution of the front and back, respectively, of a structured surface web 14 or 30 made using fibers 4 or 22, forming belts 10 or 26, and jets 12 or 28 as have been herein described. Pronounced apertures are clearly visible in FIG. 2A, as are less pronounced, but clearly visible, apertures in FIG. 2B. FIGS. 2A and 2B also illustrate the generally high degree of hydroentanglement that in combination with the apertures therein provide webs 14 and 30 with their structured surfaces. As noted above, the more pronounced apertures are preferably facing outward on the final laminate fabric for increased wiping efficiency.

A third non-woven web 40 is provided that is substantially impervious to solids or semi solids. As used herein, the terms "solids and semi-solids" refer to particles of a diameter of the range of 10 or greater microns. "Semi-solids" is also intended to refer to suspensions, pastes, gels, and similar materials having a viscosity of a level such that the material does not flow quickly or easily under gravity, and that tends to smear when wiped. Examples of such semi-solid materials include tooth paste, moist modeling clay, vacuum grease, and fecal matter.

Further, as used herein, the term "substantially impervious" and/or "substantially impermeable" are intended to indicate that the fabric is not penetrated to an extent that moisture is detectable to the human hand or discoloration evident on the back side of the wipe to the naked eye upon a single wiping of a material using the hand. Thus a "substantially impermeable" wipe upon being used to wipe fecal matter from a baby, for instance, would show no touch or sight detectable pass through discoloration or pass through moisture after a single wipe.

Non-woven web 40 may be comprised of any of a variety of materials, including, but not limited to, hydroentangled, meltblown, and thermally bond webs of staple fibers or continuous filaments. In order that the web be impermeable to solid and semi-solid materials as described herein, it is preferably tightly bound with a substantially smooth surface. Web 40 has a basis weight of at least 10 gm/m$^2$, and preferably has a basis weight in the range of 20–40 gm/m$^2$.

Figure 3A:
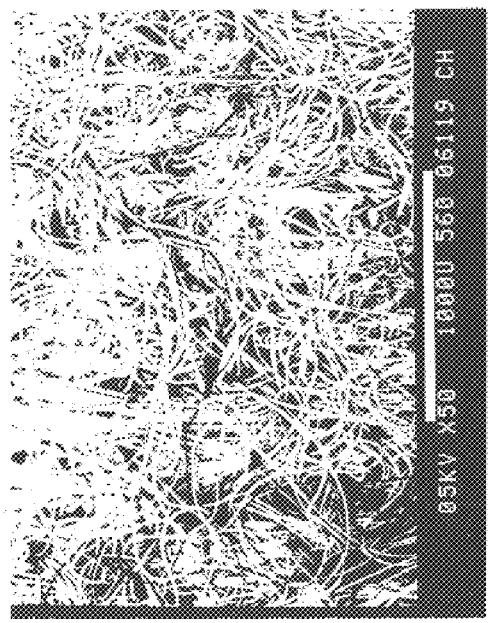
FIGS. 3A and 3B are 50 times magnification microphotographs of the front and back, respectively of an embodiment of the smooth surface web of the invention.
Figure 3B:
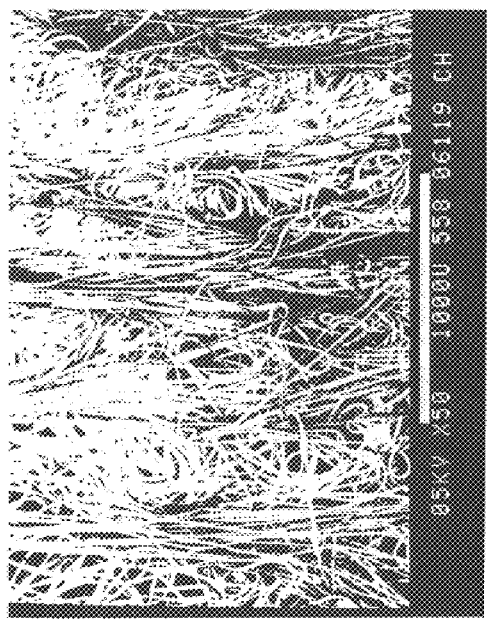

An example suitable web 40 comprises a hydroentangled web of viscose rayon/polypropylene staple fibers of 0.9–10 dtex, and 5–100 mm length. The example web 40 may be prepared by hydroentangling on a wire mesh forming belt having a plain weave of 0.45 mm diameter wire with 15 warp per cm, 12 weft per cm, and a thickness of 0.75 mm. The example web 40 is hydroentangled with water jets providing approximately 1030 kJ/kg entangling energy, and has a basis weight of 30 gm/m$^2$. FIGS. 3A and 3B are photomicrographs at 50 times resolution of the front and back, respectively, of this example web 40. Both FIGS. 3A and 3B illustrate the tightly wound, and closely spaced fiber pattern. The relatively high uniform orientation of fibers in FIGS. 3A and 3B is also noted; this generally uniform orientation provides web 40 with its generally smooth, uniform surface.

Figure 4:
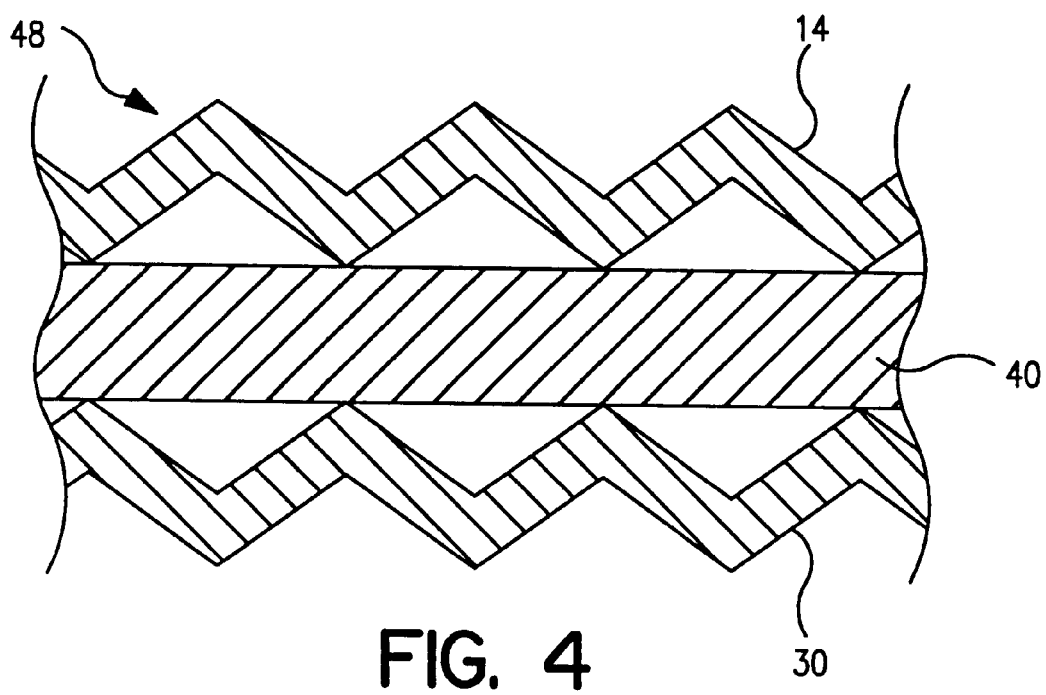
FIG. 4 is a cross section of a preferred embodiment of the fabric of the invention.

Web 40 may be prepared separately and unwound from roll 42 as illustrated in FIG. 1, or may be prepared in line with structured surface webs 14 and 30. In either case, web 40 is sandwiched between structured surface webs 14 and 30, with the three webs then laminated together by hydroentangling the three layers under water jets 44 while supported on fine belt 46. As best illustrated in the cross section of FIG. 4, a final integral, composite non-woven fabric 48 of the invention results, with structured surface non-woven layers 14 and 30 on the exposed sides, and web 40 sandwiched therebetween.

As an additional step of the method of the invention, and as an additional component of the fabric layers of the invention, absorbent materials may be added to any of webs 14, 30, or 40. Absorbent materials may comprise, by way of example, wood pulp.

As is generally known, during hydroentanglement on an apertured support, a web tends to develop more pronounced apertures on the support side as the opposite upward facing side is subject to more severe entanglement. For purposes of the present invention, it is advantageous to have the more apertured web surface outward facing on the final laminate fabric for greater wiping efficiency. FIG. 1 therefor illustrates an arrangement by which the belt 10 side of structured web 14 and the belt 26 side of structured web 30 are facing outward on final laminate fabric 48.

The preferred composite fabric of the invention 48 with its structured top and bottom surfaces 14 and 30 has been discovered to be much more effective at the wiping of solids and semi-solids than fabrics of the prior art. In addition, solid and semi-solid impermeable center layer 40 of preferred fabric 48 provide a sanitary barrier to passage through composite fabric 48 of the wiped solid or semi-solid materials. This is an important advantage of the fabric of the invention, and is most valuable for fabric applications such as baby wipes where a high value is placed on the sanitary.

Wiping Efficiency

In order to determine the efficiency of the fabric of the invention at wiping solid or semi-solid materials, a wiping efficiency test has been developed. The wiping efficiency test measures the amount of material removed during wiping by a given fabric under controlled and reproducible conditions.

Figure 6:
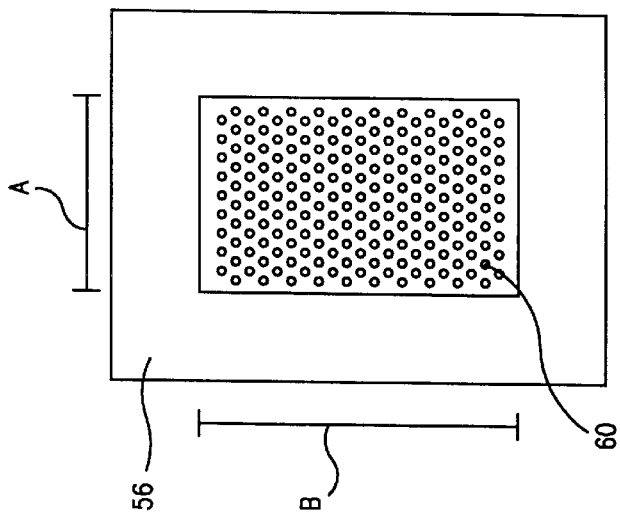
FIG. 6 is a plan view of the wiping template of the Wipe-o-meter of FIG. 5.
Figure 5:
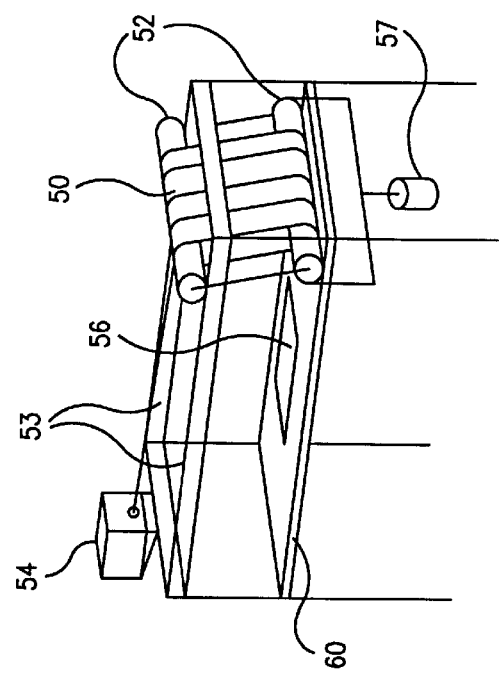
FIG. 5 is a perspective view of a Wipe-o-meter test apparatus.

The test apparatus used to quantify wiping efficiency is a Wipe-o-meter, illustrated in FIG. 5. The Wipe-o-meter generally comprises a subject test fabric wipe 50 clamped in place about a mounting set 52. Four plys of wipe 50 are wrapped on mounting set 52. A motor 54 pulls mounting set 52 along track 53 at a constant rate across a sample template 56 smeared with a known quantity of test sample. Weight 57 of 500 gm hangs below mounting set 52 to provide wiping pressure. Sample template 56 is shown in FIG. 6 in greater detail, and includes flat portion 58 and a regular pattern of 105 holes through a center portion 60 of the template. Template 56 is 10 cm by 10.5 cm, with a hole pattern of 105 holes placed in a center portion of the template having an A dimension of 4 cm and a B dimension of 6 cm. Template 56 is comprised of high molecular weight polyethylene plastic, and is 0.4 mm thick.

A test sample material is placed on template 56 covering all of holes 60, with the quantity of sample known to 0.001 gm. Spreading should lie as even as possible, and limited to center region 60. Referring again to FIG. 5, template 56 is clamped in place on Wipe-o-meter plate 62, and wipe 50 is pulled across by motor 54 at a speed such that wiping template 56 is passed in a period of 5 sec±10%. After a single pass, wiping template 56 is weighed to determine the amount of test sample wiped off. Wipe 50 is rotated about mount 52 to provide a clean section for subsequent testing. Multiple passes are conducted to average out abnormalities. Testing was conducted with relative humidity of 65% and at a temperature of 21° C.

As the fabric of the invention has particular utility as a baby wipe, a series of wiping efficiency tests were conducted using a test material chosen to simulate the approximate consistency of fecal matter. The test sample material is a baby cream paste, commercially available from the Johnson and Johnson Corporation under the trade name "Penaten—Baby Pflege—und Wundschutzcreme Weich". The material is approximately 60% lanolin.

To measure the wiping efficiency performance of the fabrics of the invention, five fabric samples were prepared. All five samples are prepared using the same fiber composition, which is a mixture of 65% 1.6 dtex, 40 mm, polyester fibers, and 35% 1.7 dtex, 40 mm, viscose rayon fibers. The first sample is a two non-woven layer fabric of the invention. The top structured surface layer is prepared using a forming belt as described above in reference to belts 10 and 26 of FIG. 1, and with entangling jets as also described with reference to jets 12 and 28 of FIG. 1. The smooth surface non-woven layer is prepared by hydroentangling the fibers (as described above) on a fine belt having 15 warps per cm and 12 wefts per cm, a belt thickness of 0.75 mm, and a polyester wire of 0.45 mm diameter. The hydroentangling jets provide 1,030 kJ/kg entangling energy.

The second sample is also a two non-woven layer fabric of the invention, prepared in the same manner as the first sample.

The third sample is a three non-woven layer fabric of the invention, as generally described above with reference to the preferred fabric of the invention. The top and bottom structured surface layer is prepared using a forming belt as described above in reference to belts 10 and 26 of FIG. 1, and with entangling jets as also described with reference to jets 12 and 28 of FIG. 1. The smooth surface non-woven layer is prepared by hydroentangling the fibers (as described above) on a fine belt having 40 warps per cm and 17 wefts per cm, a belt thickness of 0.45 mm, a polyester warp wire of 0.15 mm diameter and a polyester weft wire of 0.27 mm diameter. The hydroentangling jets provide 1,030 kJ/kg entangling energy.

The fourth sample is a reference smooth surface fabric.

Physical characteristics of the four samples are summarized in Table 1:

TABLE 1

Physical Characteristics of Sample Fabrics

| | Basis weight (gm/m$^2$) | MD Tensile N/25 mm/ply) | CD Tensile N/25 mm/ply) | Bulk (mm/4 ply) |
|---|---|---|---|---|
| Sample 1 (two layer) | 58 | 61 | 7.5 | 1.8 |
| Sample 2 (two layer) | 62 | 64 | 9 | 1.9 |
| Sample 3 (three layer) | 78 | 95 | 16.5 | 3.4 |
| Sample 4 (smooth surface single layer) | 61 | 56 | 12.5 | 1.6 |

A series of 10 wiping efficiency test runs were performed with each of the samples, using the test procedure and samples as described above. Results are summarized below in Table 2:

TABLE 2

Wiping Efficiency Test Results

Averages Over 10 Individual Wiping Efficiency Test Runs

| | Sample Applied (gm) | Sample Remaining After Wipe (gm) | Net Sample Removed (gm) | % Removed |
|---|---|---|---|---|
| Sample 1 | 0.279 | 0.072 | 0.207 | 74.2 |
| Sample 2 | 0.272 | 0.050 | 0.222 | 81.6 |
| Sample 3 | 0.294 | 0.073 | 0.221 | 75.3 |
| Sample 4 | 0.282 | 0.119 | 0.163 | 57.8 |

Wiping efficiency as described herein for solid and semi-solid matter is at least partially a function of the ability of the fabric to adsorb such matter at its surface and contain it within its bulk. Wiping efficiency and permeability to solid and semi-solid matter are therefor at least partially inversely related: non-woven materials that are adsorbent to solids and semi-solids are more likely to be permeable to such matter than non-wovens that are less adsorbent. A useful index for describing the fabric of the invention therefore may be found in a ratio of wiping efficiency of the structured surface non-woven layer to the smooth surfaced impermeable layer.

Using this index as a guide, it has been discovered that non-woven composite fabrics having a structured surface top layer and a smooth surfaced lower layer with a single wipe wiping efficiency ratio of at least 1.25:1 (top layer:lower layer), and more preferably at least 1.35:1, are most advantageous in combining an ability to efficiently wipe solids and semi-solids with an ability to prevent passage of such matter through the composite fabric.

The method and fabric of the present invention are also most advantageous in that they are relatively low in cost and simple to produce.

The advantages of the disclosed invention are thus attained in an economical, practical, and facile manner. While preferred embodiments and example configurations have been shown and described, it is to be understood that various further modifications and additional configurations will be apparent to those skilled in the art. It is intended that the specific embodiments and configurations herein disclosed are illustrative of the preferred and best modes for practicing the invention, and should not be interpreted as limitations on the scope of the invention as defined by the appended claims.

What is claimed is:

1. A method of making a non-woven fabric composite, comprising the steps of:
    a) forming a first non-woven web by hydroentangling staple fibers, said first web having a structured surface, having a basis weight of at least 10 gm/m$^2$;
    b) forming a second non-woven web; said second web substantially impervious to passage of solids and semi-solids; having a basis weight of at least 10 gm/m$^2$; and
    c) laminating said first and second webs to one another by entangling with water jets to form a composite non-woven fabric.

2. A method of making a non-woven fabric composite as in claim 1, wherein said step of forming said first non-woven web further comprises supporting said staple fibers on a support surface having raised portions and recessed void areas disposed among the raised portion.

3. A method of making a non-woven fabric composite as in claim 1, wherein said step of forming said first non-woven web further comprises supporting said staple fibers on a support surface having apertures.

4. A method of making a non-woven fabric as in claim 1, wherein said first non-woven web layer and said second web layer have a single wipe wiping efficiency ratio of at least 1.25:1 when tested with solid to semi-solid matter.

5. A method of making a non-woven fabric as in claim 1, wherein said first non-woven web layer and said second web layer have a single wipe wiping efficiency ratio of at least 1.35:1 when tested with solid to semi-solid matter.

6. A method of making a non-woven fabric composite as in claim 1, wherein said first non-woven web layer comprised of fibers chosen from the group consisting of cellulosic rayons, polyolefins, polyesters, and mixtures thereof.

7. A method of making a non-woven fabric composite as in claim 1, wherein said first non-woven web layer and said second non-woven web layer each having a basis weight of between about 20 to 40 gm/m$^2$.

8. A method of making a non-woven fabric composite as in claim 1, wherein said second non-woven web formed by hydroentangling fibers.

9. A method of making a non-woven fabric as in claim 1, further comprising the steps of a) forming a third non-woven web by hydroentangling staple fibers, said third non woven web having a structured surface and a basis weight of at least 10 gm/m$^2$; and b) attaching said third non-woven web to said second non-woven web by entangling with water jets.

10. A method of making a non-woven composite fabric, comprising the steps of:

a) forming a first non-woven web by hydroentangling staple fibers chosen from the group consisting of cellulosic rayons, polyolefins, polyesters, and mixtures thereof; said first web having a structured surface, having a basis weight of between about 20–40 gm/m$^2$;

b) forming a second non-woven web comprised of fibers chosen from the group consisting of cellulosic rayons, polyolefins, polyesters, and mixtures thereof; said second web substantially impenetrable to solids and semi-solids, having a basis weight of between about 20–40 gm/m$^2$; said first non-woven web and said second non-woven web having a wiping efficiency ratio of at least 1.25:1 (first web:second web) when tested with solid to semi-solid matter;

c) forming a third non-woven web by hydroentangling staple fibers chosen from the group consisting of cellulosic rayons, polyolefins, polyesters, and mixtures thereof; said third web having a structured surface, having a wiping efficiency of at least 70% when tested with simulated fecal matter, having a basis weight of between about 20–40 gm/m$^2$; said third non-woven web and said second non-woven web having a wiping efficiency ratio of at least 1.25:1 (third web:second web) when tested with solid to semi-solid matter; and d) laminating said first, second, and third webs together by entangling said respective webs with water jets, said second web sandwiched between said first and third webs.

* * * * *